United States Patent
Tamai et al.

(10) Patent No.: US 11,168,445 B2
(45) Date of Patent: Nov. 9, 2021

(54) CARBON FIBER SHEET AND METHOD FOR MANUFACTURING CARBON FIBER SHEET

(71) Applicant: HONDA MOTOR CO., LTD., Tokyo (JP)

(72) Inventors: Tomoko Tamai, Tochigi (JP); Yuichi Hori, Tochigi (JP); Kazuhide Matsuo, Tochigi (JP); Satoshi Aoki, Tochigi (JP); Satoshi Yonezawa, Tochigi (JP); Hidetoshi Utsumi, Tochigi (JP); Yasuro Katsuyama, Tochigi (JP); Takehiro Mugishima, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 16/323,900

(22) PCT Filed: Aug. 8, 2017

(86) PCT No.: PCT/JP2017/028795
§ 371 (c)(1),
(2) Date: Feb. 7, 2019

(87) PCT Pub. No.: WO2018/030413
PCT Pub. Date: Feb. 15, 2018

(65) Prior Publication Data
US 2019/0177918 A1    Jun. 13, 2019

(30) Foreign Application Priority Data

Aug. 10, 2016    (JP) .............................. JP2016-157923

(51) Int. Cl.
*D21H 13/50*    (2006.01)
*D21H 17/48*    (2006.01)
(Continued)

(52) U.S. Cl.
CPC ............. *D21H 13/50* (2013.01); *C01B 32/05* (2017.08); *D01F 9/12* (2013.01); *D21H 17/48* (2013.01);
(Continued)

(58) Field of Classification Search
CPC ..... C04B 35/83; C04B 35/80; C04B 38/0032; C04B 2235/5248; D01F 9/14; D01F 9/12; D01F 9/30
See application file for complete search history.

(56) References Cited

U.S. PATENT DOCUMENTS

| 4,370,141 A * | 1/1983 | Lee .......................... D01F 9/225 |
| | | 264/29.2 |
| 2003/0027471 A1 * | 2/2003 | Shimazaki ............. D03D 15/00 |
| | | 442/59 |

FOREIGN PATENT DOCUMENTS

| CN | 1401022 A | 3/2003 |
| JP | 2002-270191 | 9/2002 |

(Continued)

OTHER PUBLICATIONS

Tokita et al. "JP 2003212972 machine translation" published Jul. 30, 2003 (Year: 2003).*

(Continued)

*Primary Examiner* — Alex B Efta
(74) *Attorney, Agent, or Firm* — Rankin, Hill & Clark LLP (57) ABSTRACT

A method for manufacturing a carbon fiber sheet, the method including a carbon fiber forming step of heating a resin sheet to a carbonization temperature at a heating rate of 15,000° C./sec or higher, thereby forming a carbon fiber from the resin sheet. In the carbon fiber forming step, the resin sheet is preferably irradiated with an energy ray having an output (Continued)

density of 130 W/mm² or higher and an amount of irradiation energy of 0.05 J/mm² or more.

15 Claims, 8 Drawing Sheets

(51) Int. Cl.
| | | |
|---|---|---|
| *D21H 17/52* | (2006.01) | |
| *H05B 3/34* | (2006.01) | |
| *D01F 9/12* | (2006.01) | |
| *C01B 32/05* | (2017.01) | |
| *D01F 9/14* | (2006.01) | |

(52) U.S. Cl.
CPC ............. *D21H 17/52* (2013.01); *H05B 3/342* (2013.01); *D01F 9/14* (2013.01)

(56) References Cited

FOREIGN PATENT DOCUMENTS

| | | | |
|---|---|---|---|
| JP | 2003-212972 | | 7/2003 |
| JP | 2003212972 A | * | 7/2003 |
| JP | 2013-256724 | | 12/2013 |
| WO | 2015/175060 | | 11/2015 |

OTHER PUBLICATIONS

Chinese Office Action dated Nov. 23, 2020, 8 pages.
International Search Report, dated Nov. 7, 2017 (Nov. 7, 2017), 2 pages.

\* cited by examiner

GRAPHITE

POLYIMIDE

FIG. 13

CARBON FIBER SHEET AND METHOD FOR MANUFACTURING CARBON FIBER SHEET

TECHNICAL FIELD

The present invention relates to a carbon fiber sheet which is used as electrodes of a secondary battery, a capacitor, a fuel battery, and the like and a method for manufacturing a carbon fiber sheet.

BACKGROUND ART

In the related art, carbon fiber sheets made of carbon fibers having a sheet shape have been used as electrodes of a secondary battery, a fuel battery, and the like. This is because the carbon fibers have electrical conductivity and a large specific surface area and thus the carbon fibers are suitable for electrodes.

The carbon fiber sheet is formed generally by impregnating a thermosetting resin with a sheet, which is obtained by papermaking of carbon fibers, and then burning the sheet (for example, see Patent Document 1).

Patent Document 1: Japanese Unexamined Patent Application, Publication No. 2002-270191

DISCLOSURE OF THE INVENTION

Problems to be Solved by the Invention

However, in the method of the related art as described above, there is need of many processes such as papermaking of carbon fibers and burning, and thus it takes time and cost to obtain a carbon fiber sheet.

The present invention has been made to solve the above-described problems, and an object thereof is to provide a carbon fiber sheet which is more easily manufactured than conventional carbon fiber sheets and a manufacturing method therefor.

Means for Solving the Problems

In order to achieve the above-described object, the present invention provides a method for manufacturing a carbon fiber sheet, the method including a carbon fiber forming step of heating a resin sheet to a carbonization temperature at a heating rate of 15,000° C./sec or higher to form the resin sheet into a carbon fiber form.

In the present invention, a resin is softened when exceeding a glass transition point by laser irradiation or the like. Thereafter, decomposition of the resin starts, gas is generated, and it is speculated that the gas causes the resin to stretch, thereby forming the resin into a fiber form.

When heating is performed at a heating rate of 15,000° C./sec or higher, gas generation, fiber formation, and carbonization are almost simultaneously performed, thereby obtaining a carbon fiber sheet. According to this, a carbon fiber sheet can be more easily manufactured than conventional carbon fiber sheets.

It is preferable that, in the carbon fiber forming step, the resin sheet is irradiated with an energy ray having an output density of 130 W/mm² or higher and an amount of irradiation energy of 0.05 J/mm² or more to form the resin sheet into a carbon fiber form.

In this invention, a resin sheet such as polyimide is irradiated with the energy ray having the output density and the amount of irradiation energy within the above-described ranges. According to this, a resin such as polyimide stretches to be carbonized, so that a resin sheet such as polyimide can be formed into a carbon fiber form. Therefore, according to the present invention, a carbon fiber sheet can be more easily manufactured than conventional carbon fiber sheets.

It is preferable that, in the carbon fiber forming step, the resin sheet is irradiated with an energy ray having an output density of 150 W/mm² or higher.

In this invention, the output density of the energy ray with which a resin sheet such as polyimide is irradiated is set to 150 W/mm² or higher. When the lower limit of the output density is increased in this way, the fiber diameter tends to decrease, so that a carbon fiber sheet having a large specific surface area and a large pore volume can be manufactured.

It is preferable that, in the carbon fiber forming step, the irradiation of the energy ray is performed in the atmosphere.

In this invention, the irradiation of the energy ray to a resin sheet such as polyimide is performed in the atmosphere. According to this, a carbon fiber sheet can be easily manufactured without using a vacuum apparatus or the like.

It is preferable that a resin constituting the resin sheet is at least one selected from the group consisting of a polyimide resin, an epoxy resin, and a phenolic resin.

In this invention, regarding these resin sheets, the resin sheet is heated to a carbonization temperature at a heating rate of 15,000° C./sec or higher, so that a carbon fiber sheet can be more easily manufactured than conventional carbon fiber sheets.

Further, in order to achieve the above-described object, the present invention provides a carbon fiber sheet in which at least a part of a resin sheet is formed into a carbon fiber form. It is preferable that at least a part of the resin sheet is heated to a carbonization temperature at a heating rate of 15,000° C./sec or higher to be formed into a carbon fiber form. Further, it is preferable that at least a part of the resin sheet is irradiated with an energy ray having an output density of 130 W/mm² or higher and an amount of irradiation energy of 0.05 J/mm² or more to be formed into a carbon fiber form. Further, it is preferable that at least a part of the resin sheet is irradiated with an energy ray having an output density of 150 W/mm² or higher to be formed into a carbon fiber form. Further, it is preferable that the energy ray is irradiated in the atmosphere. Further, it is preferable that a resin constituting the resin sheet is at least one selected from the group consisting of a polyimide resin, an epoxy resin, and a phenolic resin.

In this invention, for example, at least a part of the resin sheet is heated to a carbonization temperature at a heating rate of 15,000° C./sec or higher to be formed into a carbon fiber form. According to this, a carbon fiber sheet can be more easily manufactured than conventional carbon fiber sheets.

Effects of the Invention

According to the present invention, it is possible to provide a carbon fiber sheet which is more easily manufactured than conventional carbon fiber sheets and a manufacturing method therefor.

PREFERRED MODE FOR CARRYING OUT THE INVENTION

Hereinafter, specific embodiments of the present invention will be described in detail, but the present invention is not limited to the following embodiments in any sense. The present invention can be carried out with proper modification within the scope of the object of the present invention.

In a method for manufacturing a carbon fiber sheet according to this embodiment includes a carbon fiber forming step of heating a resin sheet to a carbonization temperature at a heating rate of 15,000° C./sec or higher. In this embodiment, the method includes a carbon fiber forming step that, in the carbon fiber forming step, a resin sheet such as polyimide is irradiated with an energy ray having an output density of 130 W/mm² or higher and an amount of irradiation energy of 0.05 J/mm² or more to form the resin sheet such as polyimide into a carbon fiber form. Hereinafter, the carbon fiber forming step of this embodiment will be described in detail.

A resin constituting the resin sheet is not particularly limited as long as it is a thermosetting resin, but for example, the resin is at least one selected from the group consisting of a polyimide resin, an epoxy resin, and a phenolic resin. As the polyimide resin sheet, a sheet-shaped member made of a polyimide resin is used. In this embodiment, a commercially available polyimide resin sheet can be used, and for example, "Kapton" (registered trademark) manufactured by DuPont, "Upilex" (registered trademark) manufactured by Ube Industries, Ltd., and "AURUM" (registered trademark) manufactured by Mitsui Chemicals, Inc. can be used. Further, "Midfil" (registered trademark) manufactured by KURABO INDUSTRIES LTD. can also be used.

As the epoxy resin, a sheet-shaped member is used. In this embodiment, a commercially available epoxy resin can be used, and for example, "AS-2600" manufactured by Hitachi Chemical Company, Ltd. can be used.

As the phenolic resin, a sheet-shaped member is used. In this embodiment, a commercially available phenolic resin can be used, and for example, a phenolic resin on a paper base material manufactured by Futamura Chemical Co., Ltd. can be used.

As the energy ray, laser is preferably used. Examples of the laser include carbon dioxide laser and excimer laser. Of them, carbon dioxide laser is preferably used.

The method for manufacturing a carbon fiber sheet of this embodiment includes a carbon fiber forming step of heating a resin sheet to a carbonization temperature at a heating rate of 15,000° C./sec or higher. A resin is softened when exceeding a glass transition point by laser irradiation or the like. Thereafter, decomposition of the resin starts, gas is generated, and it is speculated that the gas causes the resin to stretch, thereby forming the resin into a fiber form. When heating is performed at a heating rate of 15,000° C./sec or higher, gas generation, fiber formation, and carbonization are almost simultaneously performed, thereby obtaining a carbon fiber sheet. According to this, a carbon fiber sheet can be more easily manufactured than conventional carbon fiber sheets.

In the carbon fiber forming step of this embodiment, the resin sheet is irradiated with an energy ray having an output density of 130 W/mm² or higher and an amount of irradiation energy of 0.05 J/mm² or more. According to this, the resin sheet such as polyimide irradiated with laser is formed into a carbon fiber form.

When the output density is lower than 130 W/mm², it is not possible to sufficiently form a resin such as polyimide into a carbon fiber form. Further, when the amount of irradiation energy is less than 0.05 J/mm², it is not possible to sufficiently form a resin such as polyimide into a carbon fiber form.

A more preferable output density of the energy ray is 150 W/mm² or higher. When the lower limit of the output density is set to 150 W/mm² (the lower limit of the output density is increased), the fiber diameter tends to decrease, so that a carbon fiber sheet having a large specific surface area and a large pore volume can be manufactured.

Further, it is preferable that the carbon fiber forming step of this embodiment is performed in the atmosphere. That is, it is preferable that a resin sheet such as polyimide is irradiated with the energy ray having the output density and the amount of irradiation energy within the above-described ranges in the atmosphere. According to this, a carbon fiber sheet can be easily manufactured without using a vacuum apparatus or the like.

Further, a resin constituting the resin sheet is at least one selected from the group consisting of a polyimide resin, an epoxy resin, and a phenolic resin. Regarding these resin sheets, the resin sheet is heated to a carbonization temperature at a heating rate of 15,000° C./sec or higher, so that a carbon fiber sheet can be more easily manufactured than conventional carbon fiber sheets.

In the carbon fiber sheet of this embodiment, at least a part of a resin sheet is formed into a carbon fiber form. It is preferable that this carbon fiber sheet is manufactured by the method for manufacturing a carbon fiber sheet described above. Specifically, it is preferable that at least a part of the resin sheet is heated to a carbonization temperature at a heating rate of 15,000° C./sec or higher to be formed into a carbon fiber form. Further, it is preferable that at least a part of the resin sheet is irradiated with an energy ray having an output density of 130 W/mm² or higher and an amount of irradiation energy of 0.05 J/mm² or more to be formed into a carbon fiber form. Further, it is preferable that at least a part of the resin sheet is irradiated with an energy ray having an output density of 150 W/mm² or higher to be formed into a carbon fiber form. Further, it is preferable that the energy ray is irradiated in the atmosphere. Further, it is preferable that a resin constituting the resin sheet is at least one selected from the group consisting of a polyimide resin, an epoxy resin, and a phenolic resin.

In this way, for example, at least a part of the resin sheet is heated to a carbonization temperature at a heating rate of 15,000° C./sec or higher to be formed into a carbon fiber form. When at least a part of the resin sheet is formed into a carbon fiber form, a carbon fiber sheet can be more easily manufactured than conventional carbon fiber sheets.

The carbon fiber sheet obtained in the carbon fiber forming step of this embodiment has electrical conductivity and also has a large specific surface area. Therefore, this carbon fiber sheet is preferably used as electrodes of a secondary battery, a fuel battery, and the like.

Examples

Hereinafter, the present invention will be described in more detail by means of Examples. Incidentally, the present invention is not limited to Examples in any sense.

As a polyimide resin sheet, Kapton (registered trademark, Model No. 100V, thickness: 25 µm) was prepared. The polyimide resin sheet was irradiated with $CO_2$ laser (wavelength: 9.3 µm) by a laser irradiation apparatus in the atmosphere. The polyimide resin sheet was subjected to a laser treatment under the conditions of the output density, the irradiation time, and the amount of irradiation energy presented in the following table to be regarded as Examples 1 to 11. Further, a polyimide resin sheet not subjected to the laser treatment was regarded as Comparative Example 1.

TABLE 1

| | Output density (W/mm$^2$) | Amount of irradiation energy (J/mm$^2$) | Heating rate (° C./sec) |
|---|---|---|---|
| Example 1 | 157 | 0.066 | 18000 |
| Example 2 | 179.5 | 0.075 | 21000 |
| Example 3 | 201.9 | 0.085 | 24000 |
| Example 4 | 224.3 | 0.094 | 30000 |
| Example 5 | 134.6 | 0.056 | 15000 |
| Example 6 | 157 | 0.822 | 23000 |
| Example 7 | 157 | 0.11 | 30000 |
| Example 8 | 157 | 0.164 | 45000 |
| Example 9 | 385.1 | 0.1 | 30000 |
| Example 10 | 481.4 | 0.1 | 30000 |
| Example 11 | 481.4 | 0.5 | 150000 |
| Comparative Example 1 | None | None | None |

(Elemental Analysis)

The surface of the portion, which was irradiated with laser, of each polyimide resin sheet of Examples 1 to 8 and Comparative Example 1 (in Comparative Example 1, the surface of a sample) was subjected to elemental analysis by X-ray photoelectron spectroscopy. The results are presented in the following table.

TABLE 2

| | Elemental analysis (Atom %) | | |
|---|---|---|---|
| | C | O | N |
| Example 1 | 98.9 | 1.1 | 0 |
| Example 2 | 98 | 2 | 0 |
| Example 3 | 98.8 | 1.2 | 0 |
| Example 4 | 98.3 | 1.7 | 0 |
| Example 5 | 97.9 | 2.1 | 0 |

TABLE 2-continued

| | Elemental analysis (Atom %) | | |
|---|---|---|---|
| | C | O | N |
| Example 6 | 98.4 | 1.6 | 0 |
| Example 7 | 97.9 | 2.1 | 0 |
| Example 8 | 97.5 | 2.5 | 0 |
| Comparative Example 1 | 76.5 | 17 | 6.4 |

As presented in Table 2, it was confirmed by the elemental analysis of Examples 1 to 8 that, in the portion subjected to the treatment by laser under the conditions of an output density of 130 W/mm$^2$ or higher and an amount of irradiation energy of 0.05 J/mm$^2$ or more, nitrogen (N) is not detected and most of the portion is carbon (C). Therefore, it was found that, by performing the laser treatment under the conditions of an output density of 130 W/mm$^2$ or higher and an amount of irradiation energy of 0.05 J/mm$^2$ or more, the polyimide resin is carbonized.

(Specific Surface Area and Pore Volume)

The specific surface area of the surface of the portion, which was irradiated with laser, of each polyimide resin sheet of Examples 1 to 11 was measured. Further, the pore volume of each of Examples 1 to 8 was also measured. The measurement results of the specific surface area and the pore volume are presented in the following table.

TABLE 3

| | Specific surface area (m$^2$/g) | Pore volume (ml/g) |
|---|---|---|
| Example 1 | 162 | 2.87 |
| Example 2 | 165 | 3.49 |
| Example 3 | 186 | 5.19 |
| Example 4 | 140 | 4.12 |
| Example 5 | 67 | 2.11 |
| Example 6 | 227 | 2.52 |
| Example 7 | 279 | 2.13 |
| Example 8 | 237 | 2.45 |
| Example 9 | 311 | — |
| Example 10 | 167 | — |
| Example 11 | 243 | — |

As presented in Table 3, it was confirmed by the measurement of the specific surface area and the pore volume that the pore volume of Example 5 having the smallest output density in Examples is also smallest in Examples 1 to 8. Further, it was confirmed that the specific surface area of Example 5 is smallest in Examples 1 to 11.

(SEM Observation)

The portion, which was irradiated with laser, of each polyimide resin sheet of Example 1, Example 4, Example 5, Example 6, Example 8, and Example 11 was subjected to SEM observation. The results are shown in FIGS. 1 to 6.

As shown in FIGS. 1 to 6, it was confirmed that, in all of the portions, which were irradiated with laser, of Example 1, Example 4, Example 5, Example 6, Example 8, and Example 11, carbon is formed into a fiber form. Further, it was found that, as the output density is increased (the lower limit of the output density is increased), the fiber diameter tends to decrease.

Figure 1:
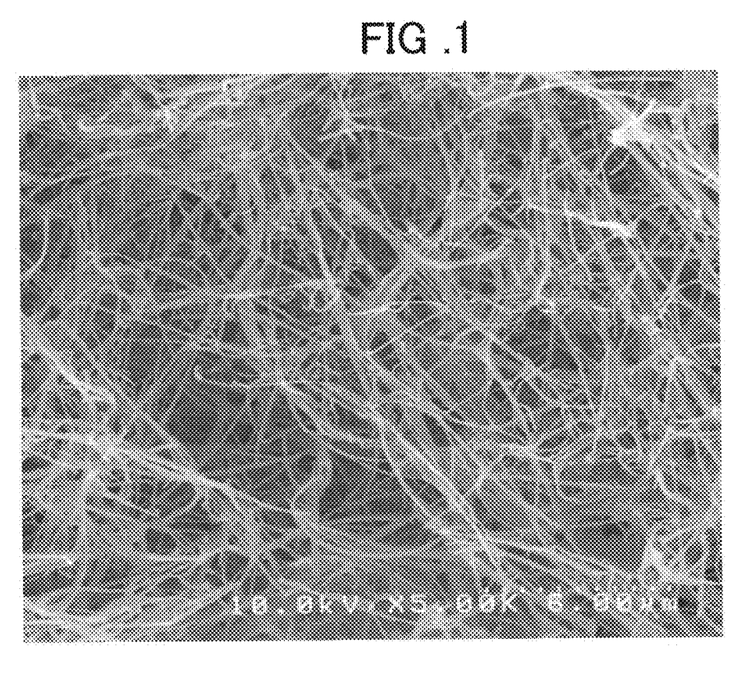
FIG. 1 is a scanning electron photomicrograph of a carbon fiber sheet according to Example 1.
Figure 2:
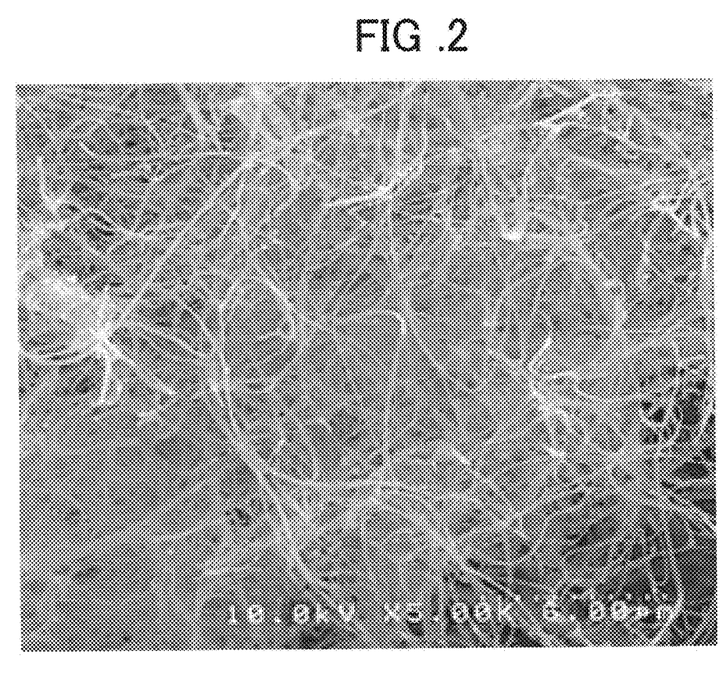
FIG. 2 is a scanning electron photomicrograph of a carbon fiber sheet according to Example 4.
Figure 3:
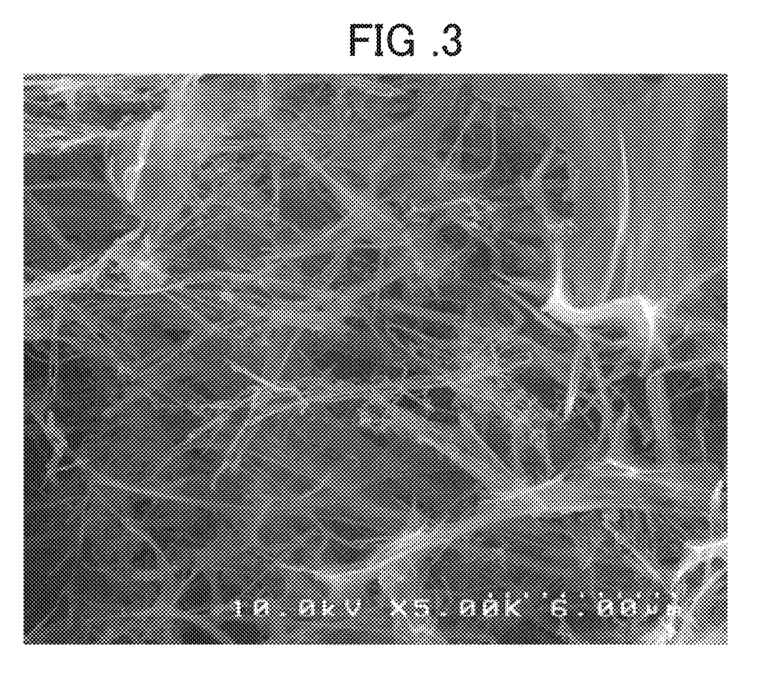
FIG. 3 is a scanning electron photomicrograph of a carbon fiber sheet according to Example 5.
Figure 4:
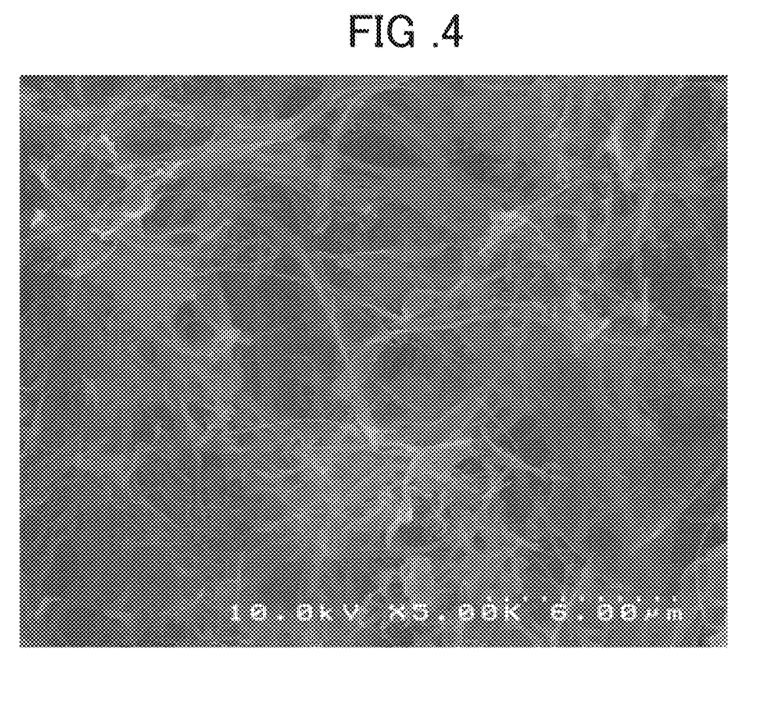
FIG. 4 is a scanning electron photomicrograph of a carbon fiber sheet according to Example 6.
Figure 5:
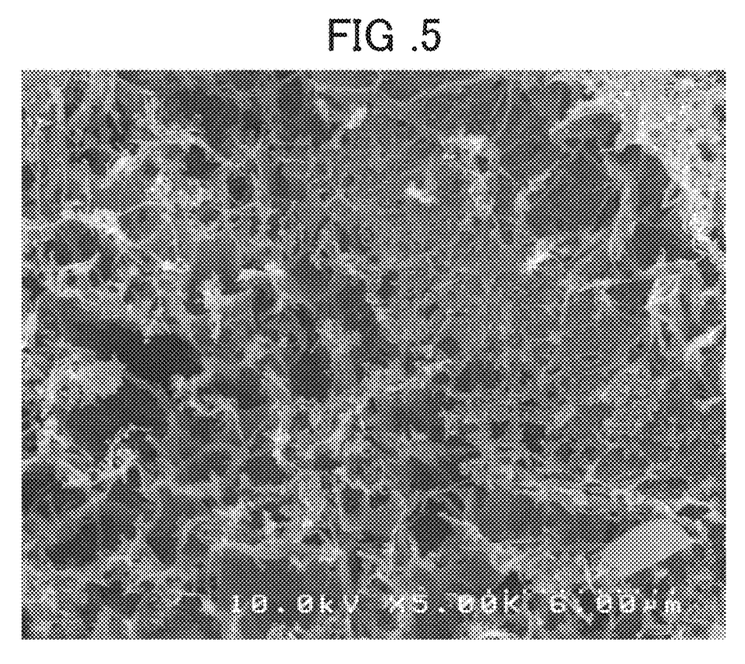
FIG. 5 is a scanning electron photomicrograph of a carbon fiber sheet according to Example 8.
Figure 6:
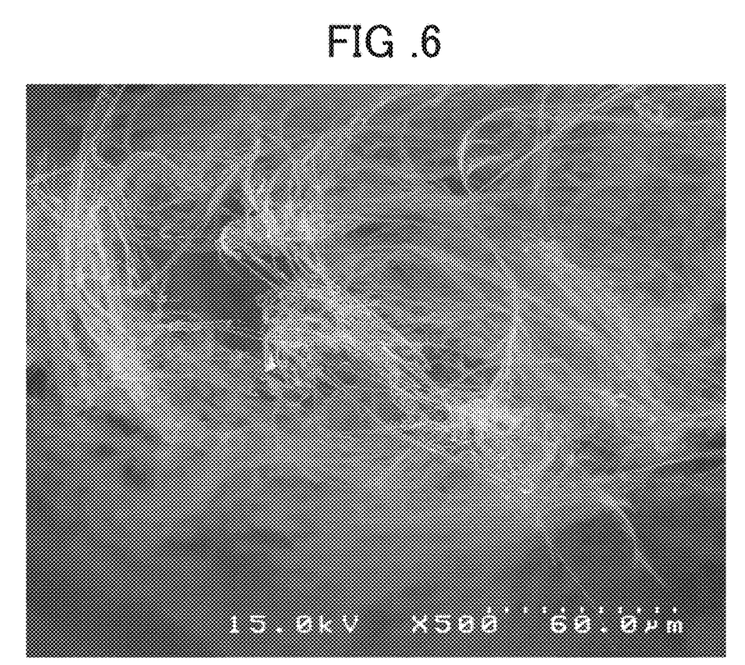
FIG. 6 is a scanning electron photomicrograph of a carbon fiber sheet according to Example 11.

In the carbon fibers of Example 5 having the smallest output density in Examples, a portion partially formed into a membrane form was confirmed (see FIG. 3). On the other hand, in the carbon fibers of Example 1, Example 4, Example 6, Example 8, and Example 11 having an output density of 150 W/mm² or higher, a portion formed into a membrane form was not confirmed (see FIGS. 1 and 2 and FIGS. 4 to 6).

(Discussion)

Figure 7:
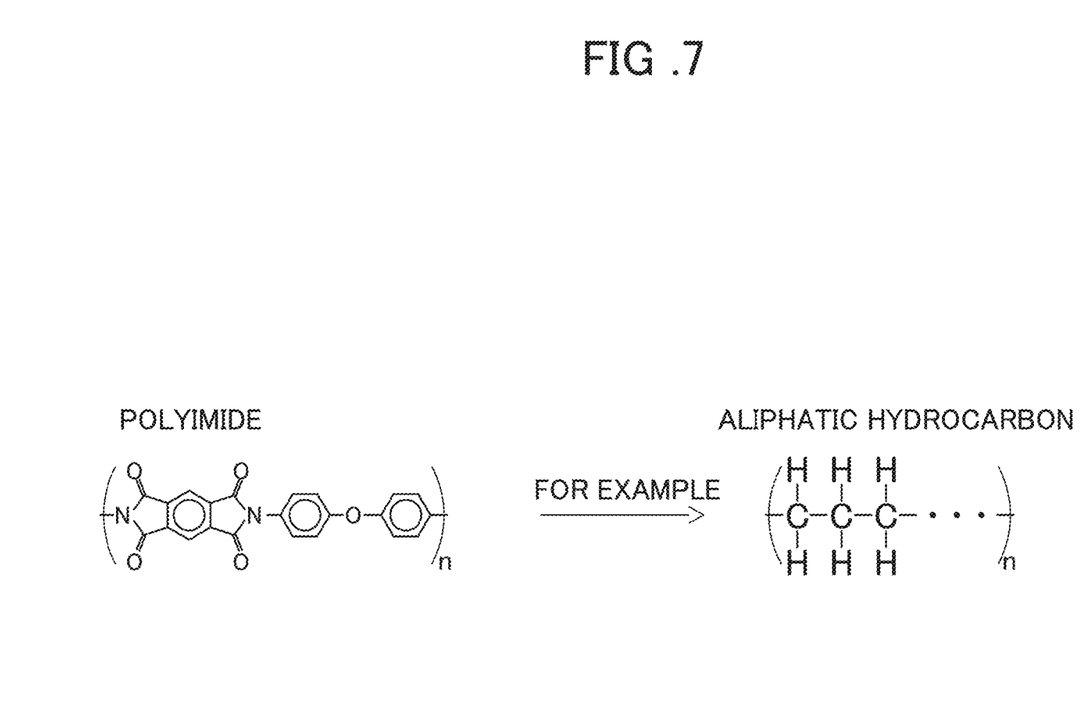
FIG. 7 is a view illustrating a reaction in a case where an amount of irradiation energy of an energy ray with which a polyimide resin sheet is irradiated is small.
Figure 8:
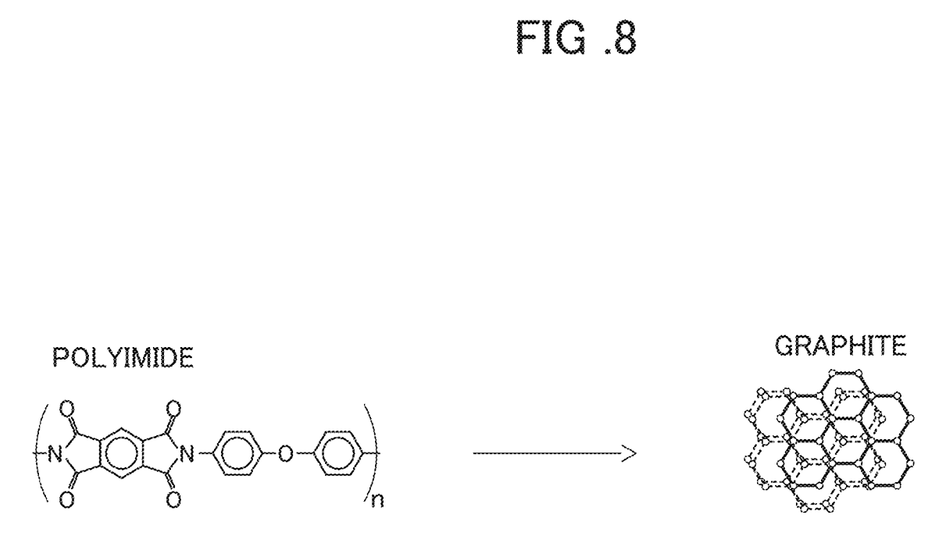
FIG. 8 is a view illustrating a reaction in a case where an amount of irradiation energy of an energy ray with which a polyimide resin sheet is irradiated is large.
Figure 9:
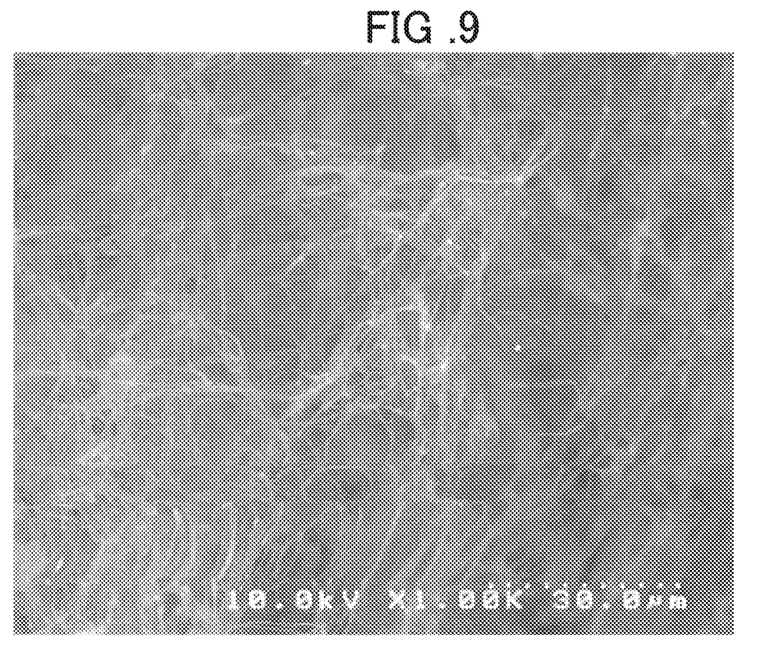
FIG. 9 is a scanning electron photomicrograph of a carbon fiber sheet according to Example 12.
Figure 10:
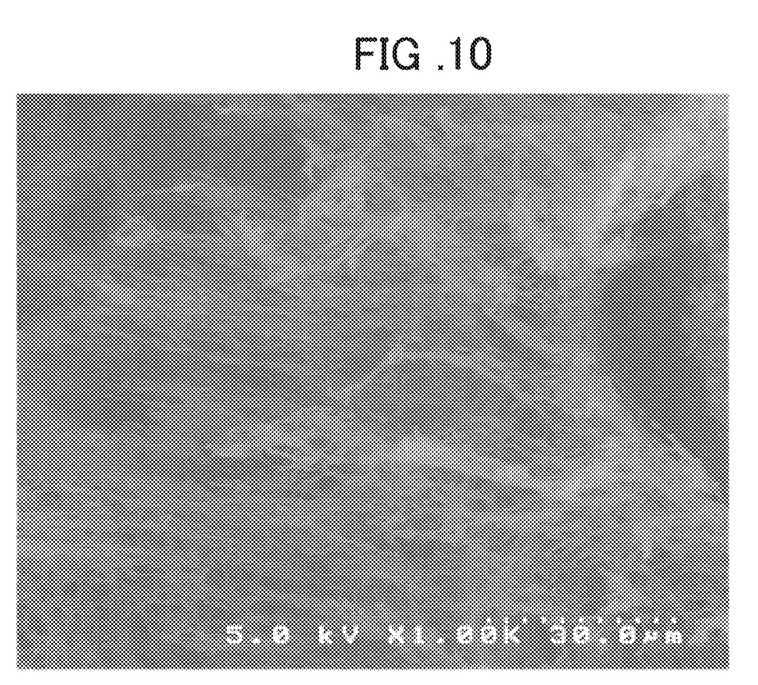
FIG. 10 is a scanning electron photomicrograph of a carbon fiber sheet according to Example 13.
Figure 11:
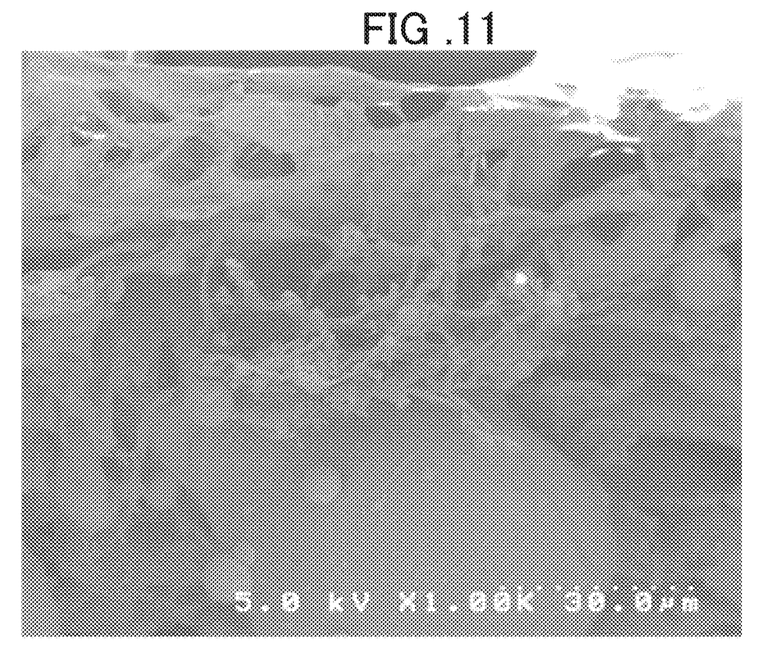
FIG. 11 is a scanning electron photomicrograph of a carbon fiber sheet according to Example 14.

The mechanism in which a portion irradiated with laser is formed into a carbon fiber form by subjecting the polyimide resin sheet to the laser treatment will be discussed. FIG. 7 is a schematic view illustrating a reaction of polyimide in a case where a polyimide resin sheet is subjected to a laser treatment under a condition of a small irradiation energy (for example, smaller than 130 W/mm²). FIG. 8 is a schematic view illustrating a reaction of polyimide in a case where a polyimide resin sheet is subjected to a laser treatment under a condition of a large irradiation energy (for example, 130 W/mm² or higher).

As illustrated in FIG. 7, when the irradiation energy of laser is small, desorption of hydrogen (H) or nitrogen (N) in the molecular structure does not proceed, for example, aliphatic hydrocarbon is generated, and as a result, carbonization (graphitization) and fiber formation do not proceed. On the other hand, as illustrated in FIG. 8, in a case where high energy is applied to a polyimide resin sheet in a short time, hydrogen (H), nitrogen (N), oxygen (O), or the like contained in polyimide is desorbed. The polyimide resin stretches when hydrogen, nitrogen, oxygen, or the like is desorbed, and fibrous graphite is formed in a portion irradiated with laser. In this way, when the laser treatment is performed under the condition of a large irradiation energy (for example, 130 W/mm² or higher), the portion irradiated with laser is formed into a carbon fiber form.

The condition for obtaining a carbon fiber sheet having a larger specific surface area and a larger pore volume will be discussed. It was confirmed that Example 5 has a small output density in Examples and the specific surface area of Example 5 is smallest in Examples (see Table 2). Further, in the carbon fibers of Example 5, a portion partially formed into a membrane form was confirmed (see FIG. 3). On the other hand, in the carbon fibers of Example 1, Example 4, Example 6, and Example 8 having an output density of 150 W/mm² or higher, a portion formed into a membrane form was not confirmed (see FIGS. 1 and 2 and FIGS. 4 to 6). From these, it was confirmed that, when the output density is 150 W/mm² or higher, a carbon fiber sheet having a larger specific surface area is obtained.

Midfil (registered trademark) and Upilex (registered trademark) were prepared as the polyimide resin sheet, AS-2600W (manufactured by Hitachi Chemical Company, Ltd.) was prepared as the epoxy resin sheet, and a phenolic resin on a paper base material (manufactured by Futamura Chemical Co., Ltd.) was prepared as a (bakelite) sheet made of a phenolic resin. These resin sheets were irradiated with $CO_2$ laser (wavelength: 9.3 μm) by a laser irradiation apparatus in the atmosphere. The polyimide resin sheet was subjected to the laser treatment under the conditions of the output density, the irradiation time, and the amount of irradiation energy presented in the following table to be regarded as Examples 12 to 18. Incidentally, in all of Examples 12 to 18, the heating rate was 15,000° C./sec or higher.

TABLE 4

| | Resin name | Output density (W/mm²) | Amount of irradiation energy (J/mm²) |
|---|---|---|---|
| Example 12 | PI (Midfil) | 130 | 1 |
| Example 13 | PI (Upilex) | 130 | 1 |

TABLE 4-continued

| | Resin name | Output density (W/mm²) | Amount of irradiation energy (J/mm²) |
|---|---|---|---|
| Example 14 | EP | 129 | 0.9 |
| Example 15 | PF | 481.4 | 1.1 |
| Example 16 | PF | 481.4 | 0.75 |
| Example 17 | PF | 481.4 | 0.42 |
| Example 18 | PF | 481.4 | 0.18 |

(SEM Observation)

The portion, which was irradiated with laser, of each resin sheet of Examples 12 to 18 was subjected to SEM observation. The results of Examples 12 to 15 are shown in FIGS. 9 to 12. As shown in FIGS. 9 to 12, it was confirmed that, in all of the portions, which were irradiated with laser, of Example 12, Example 13, Example 14, and Example 15, carbon is formed into a fiber form. Further, as compared to Example 14, in Example 12, Example 13, and Example 15, fiber formation tends to further proceed. Incidentally, it was confirmed that, also in Examples 16 to 18 (not shown), carbon is formed into a fiber form.

(Discussion)

Figure 13:
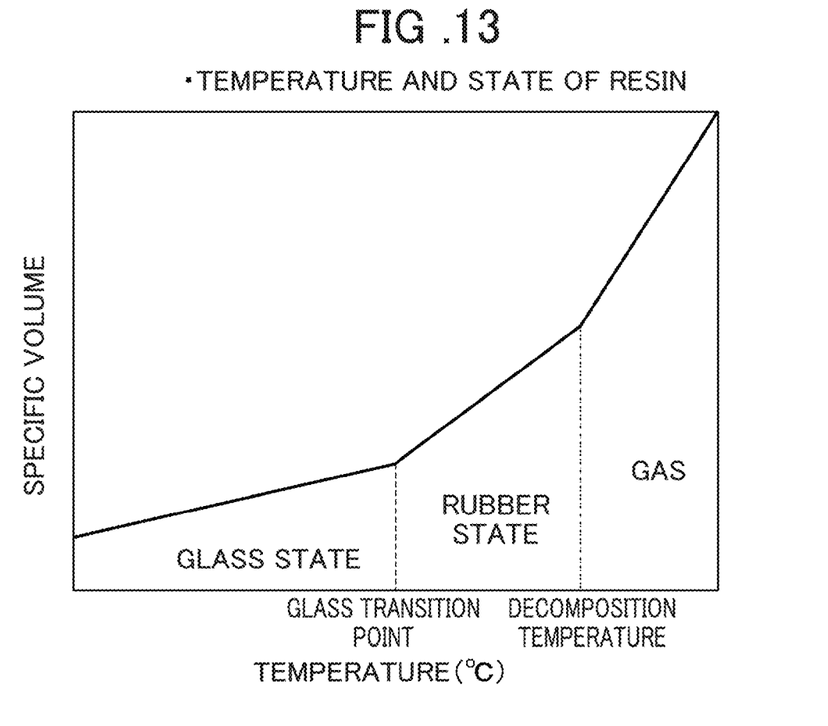
FIG. 13 is a schematic view illustrating a relation between a temperature and a state of a resin sheet.

It is shown from Examples 1 to 18 that, regardless of the types of resin, the heated portion is formed into a carbon fiber form as long as the resin sheet can be heated to a carbonization temperature at a heating rate of 15,000° C./sec or higher. The mechanism in which the heated portion is formed into a carbon fiber form by heating the resin sheet to a carbonization temperature at a heating rate of 15,000° C./sec or higher will be discussed. Table 5 described below is a table showing a relation between a resin and a glass transition point or the like thereof. Further, FIG. 13 is a schematic view illustrating a relation between a temperature and a state of a resin sheet.

TABLE 5

| | Resin name | | |
|---|---|---|---|
| | PI | PF | EP |
| Property | Thermosetting | Thermosetting | Thermosetting |
| Continuous heat-resistant temperature (° C.) | 400 | 150 | — |
| Glass transition point (° C.) | 260 | 175~200 | 66 |
| Melting point (° C.) | — | — | — |
| Decomposition temperature (° C.) | 500 or higher | Near 300 | 250~350 |
| Fiber forming tendency | Highly fiber forming | Highly fiber forming | Fiber forming |

As presented in Table 5, when a curable resin is cured once, it is considered that the curable resin is not liquefied even by heating and is decomposed when heating is continuously performed. In a case where a resin is irradiated with laser, when the temperature of a portion to be irradiated with laser exceeds a glass transition point, it is considered that the resin is softened. It is considered that, thereafter, when laser irradiation is continuously performed, the decomposition of the resin starts, gas is generated, and the gas causes the resin to stretch, thereby forming the resin into a fiber form, so that the resin sheet is formed into a carbon fiber form.

Figure 12:
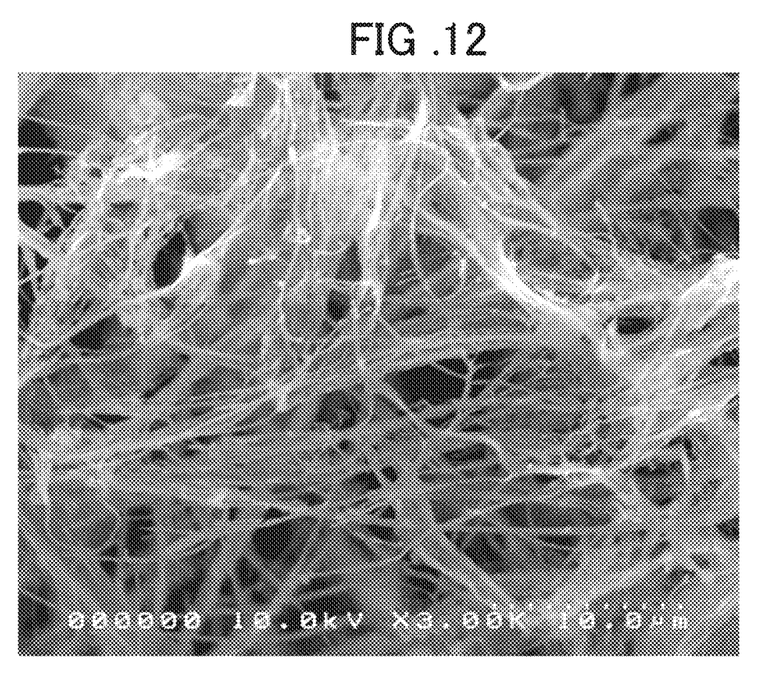
FIG. 12 is a scanning electron photomicrograph of a carbon fiber sheet according to Example 15.

As shown in FIG. 12, when the temperature of the resin sheet is higher than a glass transition point, the resin is in a rubber state, and further, when the temperature of the resin sheet is higher than a decomposition temperature, the resin is decomposed (gas is generated from the resin sheet). In order to form the resin sheet into a carbon fiber form by gas causing the resin to stretch, the fiber formation condition is set such that the temperature reaches the decomposition temperature from the glass transition point in a short time and a rubber-state resin and gas coexist. Further, if the resin sheet can be heated at a heating rate of 15,000° C./sec or higher, the temperature can reach the decomposition temperature from the glass transition point in an extremely short time. For this reason, it is considered that the rubber-state resin and gas can coexist. Therefore, it is considered that, regardless of the types of resin, the heated portion is formed into a carbon fiber form as long as the resin sheet can be heated to a carbonization temperature at a heating rate of 15,000° C./sec or higher.

The invention claimed is:

1. A method for manufacturing a carbon fiber sheet, the method comprising:
   a carbon fiber forming step of heating a resin sheet to a carbonization temperature at a heating rate of 15,000° C./sec or higher to form the resin sheet into a carbon fiber form,
   wherein, in the carbon fiber forming step, the resin sheet is irradiated with an energy ray having an output density of 130 W/mm2 or higher and an amount of irradiation energy of 0.05 J/mm2 or more to form the resin sheet into a carbon fiber form.

2. The method for manufacturing a carbon fiber sheet according to claim 1, wherein, in the carbon fiber forming step, the resin sheet is irradiated with an energy ray having an output density of 150 W/mm2 or higher.

3. The method for manufacturing a carbon fiber sheet according to claim 2, wherein, in the carbon fiber forming step, the irradiation of the energy ray is performed in an atmosphere.

4. The method for manufacturing a carbon fiber sheet according to claim 3, wherein a resin constituting the resin sheet is at least one selected from the group consisting of a polyimide resin, an epoxy resin, and a phenolic resin.

5. The method for manufacturing a carbon fiber sheet according to claim 2, wherein a resin constituting the resin sheet is at least one selected from the group consisting of a polyimide resin, an epoxy resin, and a phenolic resin.

6. The method for manufacturing a carbon fiber sheet according to claim 1, wherein, in the carbon fiber forming step, the irradiation of the energy ray is performed in an atmosphere.

7. The method for manufacturing a carbon fiber sheet according to claim 6, wherein a resin constituting the resin sheet is at least one selected from the group consisting of a polyimide resin, an epoxy resin, and a phenolic resin.

8. The method for manufacturing a carbon fiber sheet according to claim 1, wherein a resin constituting the resin sheet is at least one selected from the group consisting of a polyimide resin, an epoxy resin, and a phenolic resin.

9. A carbon fiber sheet in which at least a part of a resin sheet is formed into a carbon fiber form by being heated to a carbonization temperature at a heating rate of 15,000° C./sec or higher, by irradiation with an energy ray having an output density of 130 W/mm$^2$ or higher and an amount of irradiation energy of 0.05 J/mm$^2$ or more.

10. The carbon fiber sheet according to claim 9, wherein at least a part of the resin sheet is irradiated with an energy ray having an output density of 150 W/mm2 or higher to be formed into a carbon fiber form.

11. The carbon fiber sheet according to claim 10, wherein the energy ray is irradiated in an atmosphere.

12. The carbon fiber sheet according to claim 10, wherein a resin constituting the resin sheet is at least one selected from the group consisting of a polyimide resin, an epoxy resin, and a phenolic resin.

13. The carbon fiber sheet according to claim 9, wherein the energy ray is irradiated in an atmosphere.

14. The carbon fiber sheet according to claim 13, wherein a resin constituting the resin sheet is at least one selected from the group consisting of a polyimide resin, an epoxy resin, and a phenolic resin.

15. The carbon fiber sheet according to claim 9, wherein a resin constituting the resin sheet is at least one selected from the group consisting of a polyimide resin, an epoxy resin, and a phenolic resin.

* * * * *